(12) United States Patent
Goolgasian (10) Patent No.: US 8,019,671 B2
(45) Date of Patent: Sep. 13, 2011

(54) LEGACY RISK

(75) Inventor: Chris Goolgasian, Smithfield, RI (US)

(73) Assignee: FMR LLC, Boston, MA (US)

( * ) Notice: Subject to any disclaimer, the term of this patent is extended or adjusted under 35 U.S.C. 154(b) by 417 days.

(21) Appl. No.: 12/361,371

(22) Filed: Jan. 28, 2009

(65) Prior Publication Data

US 2010/0191667 A1 Jul. 29, 2010

(51) Int. Cl.
*G06Q 40/00* (2006.01)

(52) U.S. Cl. .......................................... 705/36

(58) Field of Classification Search ...................... 705/36
See application file for complete search history.

(56) References Cited

OTHER PUBLICATIONS

Obizhaeva, Anna: Portfolio Transitions and Stock Price Dynamics, Mar. 22, 2009, Rober Smith School of Business, Unoversity of Maryland, pp. 1-38.*
Mason et al. : Optimizing Portfolio Transitions, Spring 2001, Transaction Costs, pp. 1-4.*

* cited by examiner

*Primary Examiner* — Bijendra K Shrestha
(74) *Attorney, Agent, or Firm* — Proskauer Rose LLP (57) ABSTRACT

Data corresponding to a set of securities is identified. For each security in the set, data corresponding to a legacy risk contribution from a corresponding security in the set is identified. Data corresponding to a legacy risk of the entire set is identified based on the legacy risk contributions. The legacy risk is displayed.

18 Claims, 6 Drawing Sheets

FIG. 1A

| Stock | Weight | Duration (years) |
|-------|--------|------------------|
| A | .18 | 4.1 |
| B | .4 | .1 |
| C | .22 | .2 |
| D | .07 | .6 |
| E | .13 | 4.6 |

LEGACY RISK

TECHNICAL FIELD

This application relates to finance. More particularly, this application relates to risk assessment and/or management.

BACKGROUND

An individual, advisor, planner or institutional investor often is charged with managing a portfolio of investments. Such investments in the portfolio may include instruments whose value changes with time, such as stocks, bonds, commodities, etc. Typically, an investor seeks to maximize the value of the portfolio, by buying or holding instruments whose value the investor believes will increase, and selling instruments whose value the investor believes will decrease.

Often, an investor's decision to buy, sell, or hold a particular investment instrument is not exclusively based on numerical data. One area of inquiry is known as "Behavioral Finance," which studies non-numerical (e.g., psychological or sociological) reasons why investors decide to buy, sell, or hold certain instruments. For example, an investor might have been bought an instrument based on a certain thesis and or price target, however they may continue to hold the security even though the original thesis and or price target has changed due to some form of a behavioral bias.

SUMMARY

In general, in one aspect: identifying data corresponding to a set of securities, using the data, identifying a legacy risk contribution for each security in the set, using each of the legacy risk contributions, identifying a legacy risk of the set; and displaying the legacy risk.

Implementations may include one or more of the following features. The set of securities consists of pre-selected portion of a fund's holdings. The pre-selected portion includes a pre-selected number of the fund's highest-weighted securities. The pre-selected portion includes a pre-selected number of the fund's longest-held securities. The pre-selected portion includes the entire fund. The legacy risk contribution for a particular security is identified based on: data corresponding to a period with which the particular security has been held, data corresponding to a weight associated with the particular security. Identifying a legacy risk contribution includes: identifying data corresponding to a particular security, identifying data corresponding to a period with which the particular security has been held, identifying data corresponding to a weight associated with the particular security, identifying data corresponding to a period-scaling function, identifying data corresponding to a weight-scaling function, computationally applying the period-scaling function to the period data, thereby producing data corresponding to a scaled period, computationally applying the weight-scaling function to the weight data, thereby producing data corresponding to a scaled weight, computationally combining the scaled period data and scaled weight data.

In general, in another aspect: identifying data corresponding to a portfolio, identifying data corresponding to a pre-sale legacy risk of the portfolio, determining whether the pre-sale legacy risk exceeds a threshold, if the pre-sale legacy risk exceeds a threshold, producing data corresponding to selling a portion of the portfolio, receiving a confirmation of selling the portion of the portfolio, identifying data corresponding to a post-sale legacy risk of the portfolio that is less than the pre-sale legacy risk of the portfolio.

Implementations may include one or more of the following features. Producing data corresponding to selling the portion of the portfolio further comprises iteratively: identifying a data corresponding to a subset of securities in the portfolio, identifying a data corresponding to a legacy risk contribution of subset, if the legacy risk of the portfolio minus legacy risk contribution of the subset is less than the threshold, then producing data corresponding to selling the subset of the portfolio, otherwise including further securities in the subset.

In general, in another aspect: automatically querying a portfolio manager on renewing a position in the portfolio, receiving an indication of an intent to renew the position; based on receiving the indication, adjusting data corresponding to a legacy risk contribution associated with the position.

Implementations may include one or more of the following features. Adjusting the data corresponding to the legacy risk contribution includes computing the legacy risk contribution of the position as if the position had been entered into as of a time at which the indication was received.

Other aspects include other combinations of the features recited above and other features, expressed as methods, apparatus, systems, program products, and in other ways.

Advantages of particular implementations include helping identify instances where psychological or sociological traits of fund management cause sub-optimal investment behavior. These traits may include—but are not limited to—the following.

Conservatism bias. An investor exhibiting a conservatism bias is too slow to update beliefs or investments in response to new information.

Prospecting. An investor engaging in prospecting will view gains and losses differently. For example, a loss of a certain magnitude will be viewed more negatively than a gain of an equal magnitude will be viewed favorably. This can lead to investors holding on to losing positions and selling winning positions.

Regret avoidance. An investor exhibiting regret avoidance may penalize themselves more for bad decisions if those decisions went against the norm.

Mental accounting. An investor exhibiting mental accounting may segregate certain decisions which rationally should be viewed as one decision.

Forecasting errors. For example, investors may put too much emphasis on recent experience (vs. previous knowledge) when making a forecast, thus the forecast becomes too extreme.

Overconfidence. Investors exhibiting overconfidence overestimate their skills and the precision of their forecasts.

Improper awareness of sample size/neglecting representativeness. Investors may believe a small sample size of investment data is just as valid as a larger one.

Traditional investment metrics (such as volatility, standard deviation, tracking error, beta, etc.) can help characterize a particular stock or a collection of stocks. However, such traditional metrics do not help characterize whether a fund manager himself presents risk to a portfolio, for example by virtue of the fund manager's behavioral or sociological characteristics. The techniques described below, however, help identify such behavioral or sociological biases.

Other features and advantages will be apparent from the description and from the claims.

DETAILED DESCRIPTION

Investors, such as fund managers, advisors, planners or individual consumers, often own or are responsible for a portfolio of investment instruments, such as stocks, commodities, etc. For ease of exposition in what follows, it will be assumed that this portfolio is composed simply of stocks, and is under the control of a fund manager. However, the techniques described below are applicable to any collection of investments that can be individually bought or sold and whose value changes with time. The word "stock" should be understood to include any such instrument. Moreover, the phrase "fund manager" is not limited to a person professionally engaged in the business of managing a portfolio, like an advisor or planner, but may include individuals carrying out transactions for their own benefit; e.g., an individual managing his or her own personal investment portfolio. The phrase "fund manager" may also include a group of people who collectively manage an investment portfolio.

For a variety of reasons—which may be rational or irrational—a fund manager may decide to hold a particular stock for a relatively long time. For example, a fund manager who purchased a stock may be hesitant to sell the stock until it can be sold for a profit. This hesitation may be irrational in the presence of new information which is counter to their original thesis for holding the security. Nevertheless, as a matter of psychology or sociology, some fund managers may be obstinate in holding the stock even in the presence of such information.

Similarly, if a stock performs favorably or nominally for a relatively long period of time, the fund manager may be inclined to hold this stock on the assumption that it will continue to perform as such. This inclination may be irrational if circumstances that previously caused the stock to perform well or nominally have changed. Nevertheless, as a matter of psychology or sociology, some fund managers may become complacent in keeping long-held stocks, even in the absence of an affirmative reason to do so.

In general, it is difficult to definitively evaluate whether a particular stock is rationally or irrationally held in a portfolio, or whether the portfolio's composition is rational or irrational. However, the techniques described below, including the new metric "Legacy Risk," help identify when a portfolio may include irrationally-held stocks, or whether a particular stock may be irrationally-held. The term "legacy" refers to the idea that a stock may have been held for a very long time in the portfolio. The term "risk" refers to the concept that holding a stock for a very long time may introduce a new set of behavioral risks into the managers decision process.

Figure 1A:
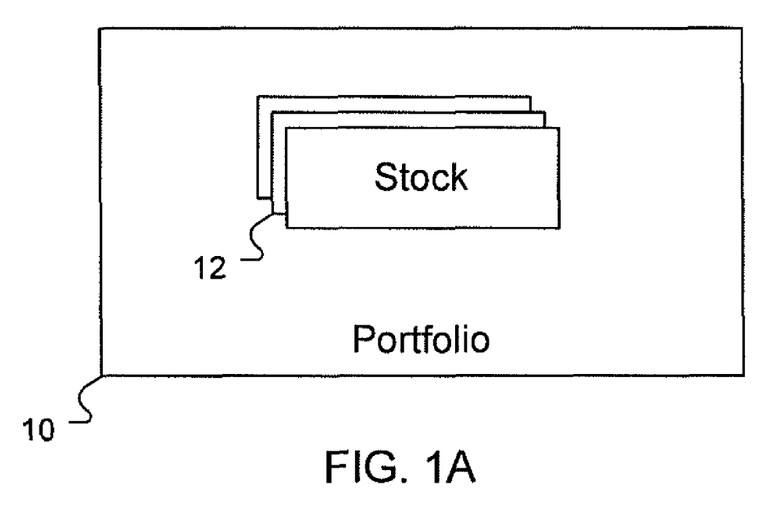
FIG. 1A is a schematic depiction of a portfolio.

FIG. 1A is a schematic depiction of a portfolio 10. The portfolio 10 includes one or more stocks 12, each of which is present in particular proportions in the portfolio. The relative proportions are also called "weights." The proportions may be expressed in any manner. For example, the proportion of a given stock 12 may be expressed as the total value of the stock, divided by the total value of the portfolio 10. In another example, stocks 12 are often held in units of shares. In this case the proportion of a stock 12 in the portfolio 10 can also be expressed as the number of shares of the stock divided by the total number of shares in the portfolio.

Figure 1B:
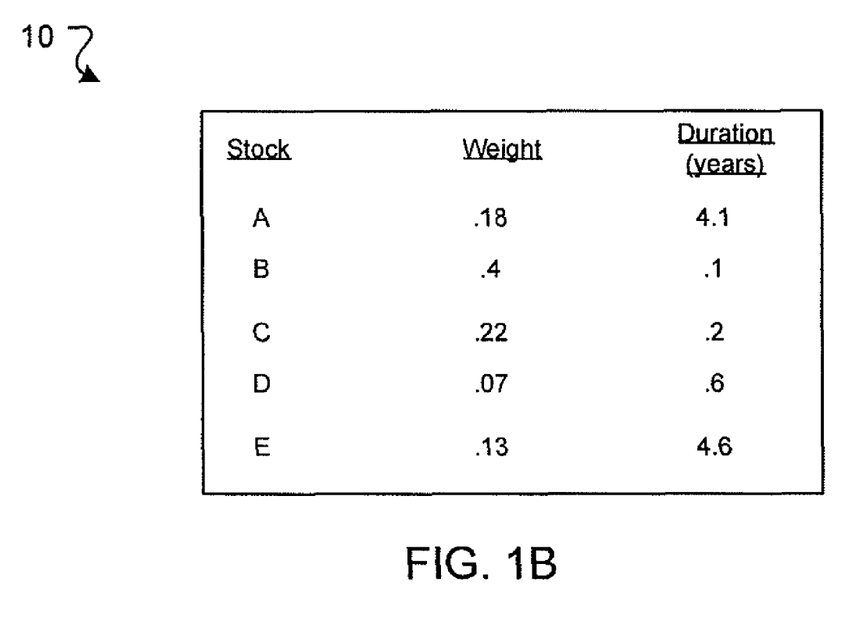
FIG. 1B is an exemplary depiction of a portfolio.

FIG. 1B is an exemplary portfolio 10. The portfolio consists of five stocks 12 in the indicated proportions. Also included in FIG. 1B is information pertaining to the period with which each stock has been held in the portfolio. For example, Stock A has been held four years longer than Stock B. Stock E has been held the longest of all the stocks 12 in the portfolio 10.

It may occur that for a portfolio 10 having a stock 12, a fund manager may purchase more of the same stock, or may sell only a portion of its holdings in the stock. In the case of purchasing more of the same stock, each "block" of stock may be treated as separate stocks, each having their own distinct holding period data. Alternatively, the entire portfolio's holdings of the stock (both the previously-owned and newly-acquired) can be treated as if it were acquired as of the latest or earliest purchase date. Either treatment is consistent with the techniques described below.

Similarly, in the case of selling only a portion of a particular stock, the holding period data may remain either unchanged, or may be updated as if the remaining stock were actually acquired on the date that the portion was sold. Either treatment is consistent with the techniques described below.

As used herein, "legacy risk" refers to one of a family of metrics that can used to characterize a portfolio. In what follows below, suppose a portfolio P consists of stocks $s_i$, where i runs from 1 to n. Let $d_i$ denote the period for which the stock $s_i$ has been held, and let $w_i$ denote the weight with which $s_i$ appears in the fund F. In one embodiment, the legacy risk ("LR") of the portfolio P is defined as the sum:

$$LR = \sum_{i=1}^{n} d_i w_i \qquad (1)$$

The individual summand $d_i w_i$ for a specific i is referred to as the "legacy risk contribution" corresponding to the stock $s_i$.

For example, in the portfolio of FIG. 1B, the legacy risk contribution of Stock A is (0.18)(4.1)=0.738. The total legacy risk of the portfolio is (0.18)(4.1)+(0.4)(0.1)+(0.22)(0.2)+(0.07)(0.6)+(0.13)(4.6)=1.462.

From equation (1), it is clear that legacy risk has the property that long-held positions have greater legacy risk contributions than recently-entered positions of equal weight. Similarly, it is also evident from equation (1) that a position with a relatively large weight in the portfolio will have a greater legacy risk contribution than a position with a relatively small weight that has been held for the same period.

Newer acquisitions in the portfolio have smaller legacy risk contributions, a relatively large legacy risk may indicate that a portfolio's holdings are not changing very much as time continues. Thus, a large legacy risk may indicate that a portfolio is subject to behavioral biases of investment management. Similarly, at the individual position level, if a particular position in a portfolio has a large legacy risk contribution, that position may also be subject to behavioral biases.

The legacy risk metric as defined in equation (1) may be refined in a number of ways. In one refinement, the sum in equation (1) does not range over the entire portfolio, but rather over a pre-defined subset. The pre-defined subset may include, e.g., only the positions in the portfolio with the top x highest weights, the top x longest holding periods, etc., where x represents either a number or a quantile. This refinement useful, among other reasons, for limiting the computational expense of computing legacy risk for large portfolios.

For example, in the portfolio of FIG. 1B, if only the top 40% (by weight) of the portfolio is used to compute legacy risk, then its legacy risk is given by (0.22)(0.2)+(0.18)(4.1)=0.782.

Another refinement involves the application of scale functions either to the holding period $d_i$ or the weight $w_i$ (or both). For example, define the function $f$ by $$f(t) = \begin{cases} 0 & \text{if } t \leq t_0 \\ t & \text{if } t > t_0 \end{cases} \quad (2)$$

and define a legacy risk metric by:

$$LR = \sum_{i=1}^{n} f(d_i) w_i. \quad (3)$$

Note that no stock in the portfolio has a non-zero legacy risk contribution until it is held for a time greater than $t_0$. Thus, one may use this scaling function $f$ to implement a "grace period," ($t_0$) before which no position in the portfolio can contribute to legacy risk. More generally, the function $f$ above can be replaced any function $f$ such that $0 \geq f(t) \geq t$ for $0 \geq t \geq t_0$, and $f(t)=t$ for $t>t_0$ to implement more refined grace period treatments.

Conversely, consider the function $$f(t) = \begin{cases} t & \text{if } t \leq t_0 \\ te^{(t-t_0)} & \text{if } t > t_0. \end{cases} \quad (4)$$

With $f$ defined as in equation (4) and legacy risk defined as in equation (3), then stocks that are held for a time shorter than $t_0$ have "ordinary" legacy risk contribution (i.e., as defined in equation (1)), but stocks that are held for a time greater than $t_0$ have a greater-than-ordinary risk contribution. Thus, the function $f$ defined in equation (4) can be used to implement a "penalty" for holding stocks longer than $t_0$. Any function $f$ that satisfies $f(t)=t$ for $t<t_0$ and $f(t) \geq t$ can be used to implement a similar penalty.

One may also use scaling functions on the weights $w_i$. For example, functions such as that described in equation (3) and the paragraph thereafter can be applied to a stock's weight in computing the stock's legacy risk contribution to ensure that no stock before a threshold weight can contribute to the legacy risk of the portfolio, regardless how long that stock was held. Conversely, functions such as that described in equation (4) and the paragraph thereafter can be applied to a stock's weight in computing the stock's legacy risk contribution to ensure that stocks above a threshold weight contribute greater-than-ordinary to the legacy risk of the portfolio.

In the case of both holding periods and weights, other scaling functions are possible. For example, scaling functions defined piece-wise as described above on any different intervals can be used to fix, increase, or decrease the legacy risk contribution for holding periods or weights within the intervals.

Moreover, instead of combining the various legacy risk contributions by addition, as described in equations (1) and (3), other combinations may be used. For example, the legacy risk contributions may be multiplied together. More generally, the legacy risk contributions may be combined by using a symmetric function of n variables, where n equals the number of stocks contributing to the legacy risk metric. As used herein, a function $f$ of n variables is "symmetric" if the value of $f$ is invariant under any permutation of its arguments. For example, a function $f$ of three variables is symmetric if and only if $f(x,y,z)=f(y,z,x)=f(z,x,y)=f(x,z,y)=f(z,y,x)=f(y,x,z)$ for any x, y, z.

Figure 2:
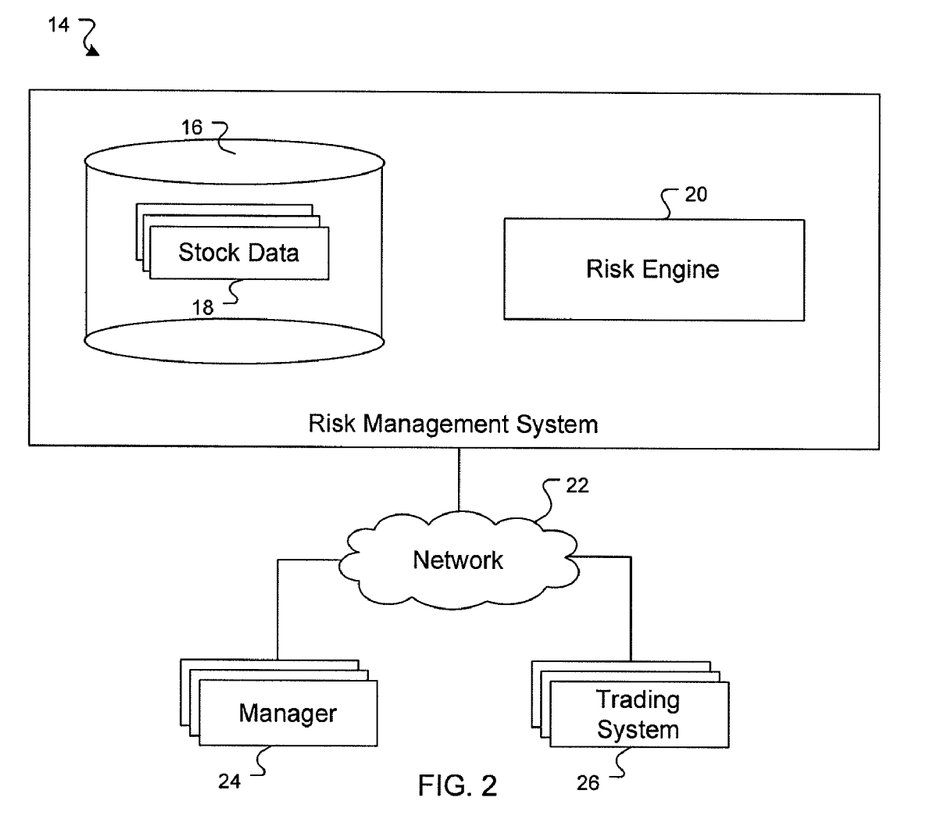
FIG. 2 is a schematic depiction of a legacy risk management system.

FIG. 2 is a schematic depiction of a risk management system 14. The risk management system 14 includes a data store 16 and a risk engine 20.

The risk management system 14 is in data communication with one or more managers 24, and one or more trading systems 26. The data communication may be implemented in any manner, such as by direct physical connection (e.g., using a wire or fiber optic cable), wireless connection, or indirect connection through a communications network 22 or other intermediate equipment. Although only one network 22 is shown in FIG. 2, any number of distinct networks can be used to connect with different managers 24 and/or trading systems 26. For example, a group of managers 24 may connect to the risk management system 14 via a wide-area network such as the Internet, while the risk management system is connected to various trading systems 26 through direct connection or a local-area network.

The data store 16 can include hardware, software, or a combination of hardware and software. Such hardware can include any data-storage hardware such as magnetic or optical disks, solid-state memory, etc. Such software can include data structures such as databases, lists, arrays, etc., together with software for reading and/or writing to the data structures. Moreover, the data store 16 can be implemented virtually, as an address or collection of addresses from which data can retrieved, irrespective of the data's physical location (whether within or external from the risk management system 14).

The data store 16 includes stock data 18. Such stock data 18 includes, but is not limited to, names or identifiers of different stocks 12 that comprise one or more portfolios 10, the period each stock has been held in each portfolio, and the relative weights each stock has in each portfolio. Moreover, the stock data 18 includes the historical transaction data (e.g., prices, number of shares, relative weights, dates of transaction, etc.) of the individual stocks 12 that comprise each portfolio 10. The data store may also contain date information for certain automated events. See, e.g., FIG. 5.

Figure 3:
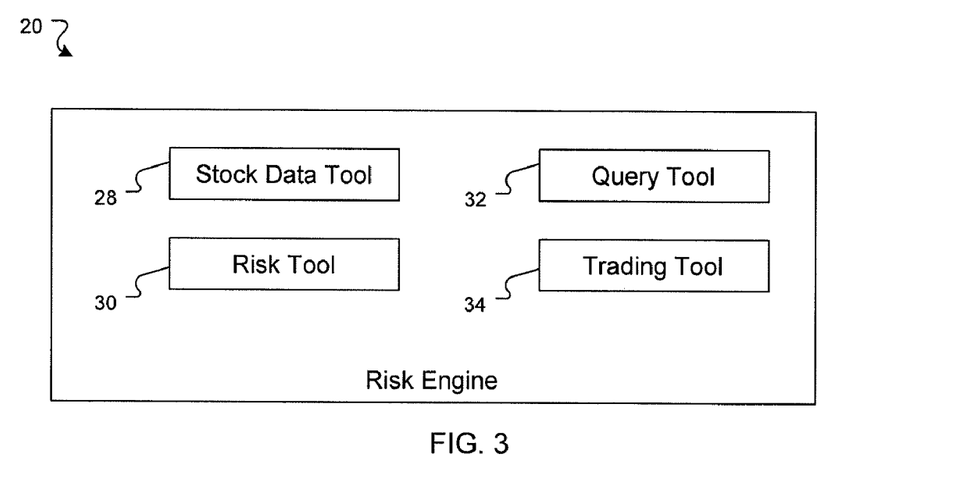
FIG. 3 is a schematic depiction of a risk engine.

FIG. 3 is a schematic depiction of a risk engine 20. The risk engine 20 a stock data tool 28, a risk tool 30, a query tool 32, and a trading tool 34. Each of the tools 28-34 are in data communication with each other and the data store 16 directly, or indirectly via other components of the risk management system 14. Each tool may be implemented as hardware, software, or a combination of hardware and software.

The stock data tool 28 is operable to read and/or write stock data 18 from and/or to the data store 16. In some implementations, the stock data tool 28 provides certain stock data 18 to the risk tool 30. See, e.g., FIG. 4. In some implementations, the stock data tool 28 accepts input from the query tool 32. See., e.g., FIG. 5.

The risk tool 30 is operable to calculate legacy risk. See, e.g., FIG. 4. In some implementations, the risk tool 30 calls the stock data tool 28 for input and to handle output. In some implementations, the risk tool 30 accepts input from the query tool 32. See., e.g., FIG. 5.

The query tool 32 is operable to interact with a manager 24. In some embodiments, the query tool 32 automatically poses queries to a manager 24 about the holdings of the manager's portfolio. See, e.g., FIG. 5.

The trading tool 34 is operable to identify or implement trades of stocks 12 in a portfolio 10. In some implementations, the trading tool 34 accepts output from the risk tool 30 in order to identify or implement trades. In some implementations, the trading tool 34 initiates data communication with external trading systems 26 to execute trades.

Figure 4:
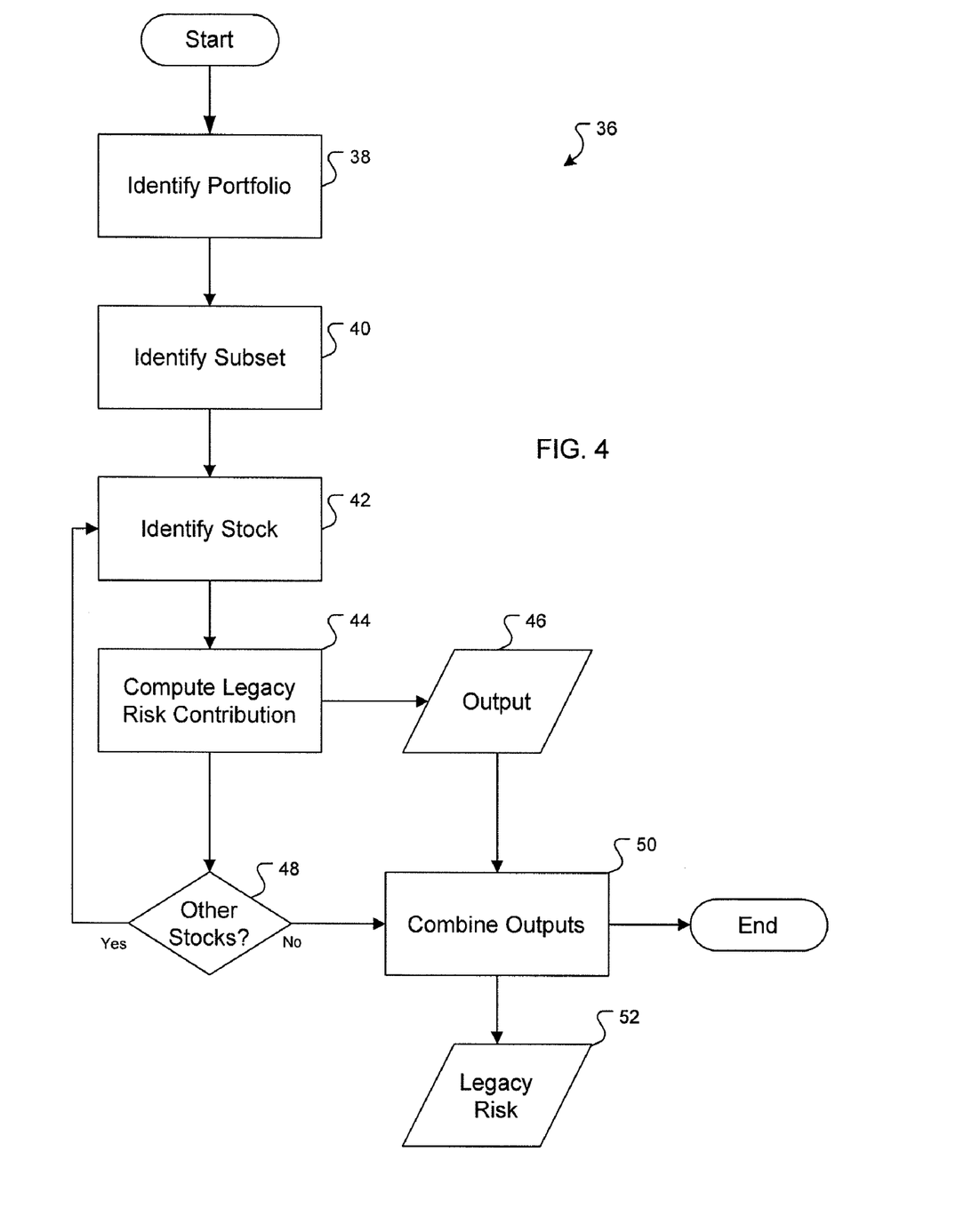
FIGS. 4-5 is a flowchart for computing legacy risk.

FIG. 4 is a flowchart for computing legacy risk. In step 38, a portfolio is identified (step 40), and a subset of the portfolio is identified (step 42). The subset can be identified as, e.g., only the positions in the portfolio with the top x highest weights, the top x longest holding periods, etc., where x represents either a number or a quantile. In particular, the subset can be the entire portfolio. In some implementations, a manager 24 identifies the portfolio and/or subset. In some implementations, the risk tool 30 identifies the portfolio and/or the subset, either automatically or in response to input from a manager 24.

From the identified subset, a single stock is identified (step 42). The legacy risk contribution from the identified stock is computed (step 44), thereby producing numerical output 46. The output 46 may be resident in any addressable location, e.g. in memory or on a data storage medium. In some implementations, the risk tool 30 performs steps 42 and 44.

At decision 48, it is determined whether there are stocks in the subset which have not been previously identified in an iteration of step 42. If so, steps 42 and 44 are performed again on such previously-unidentified stocks. If not, the various legacy risk contributions 46 are combined (step 50), thereby producing a legacy risk for the portfolio. In some implementations, the risk tool 30 performs decision 48 and step 50. In some implementations, step 50 involves adding the outputs 46, multiplying the outputs 46, or otherwise combining the outputs 46 via a symmetric function. The output of step 50 is the legacy risk 52. The legacy risk 52 may subsequently be displayed, e.g. to a fund manager 24.

Figure 5:
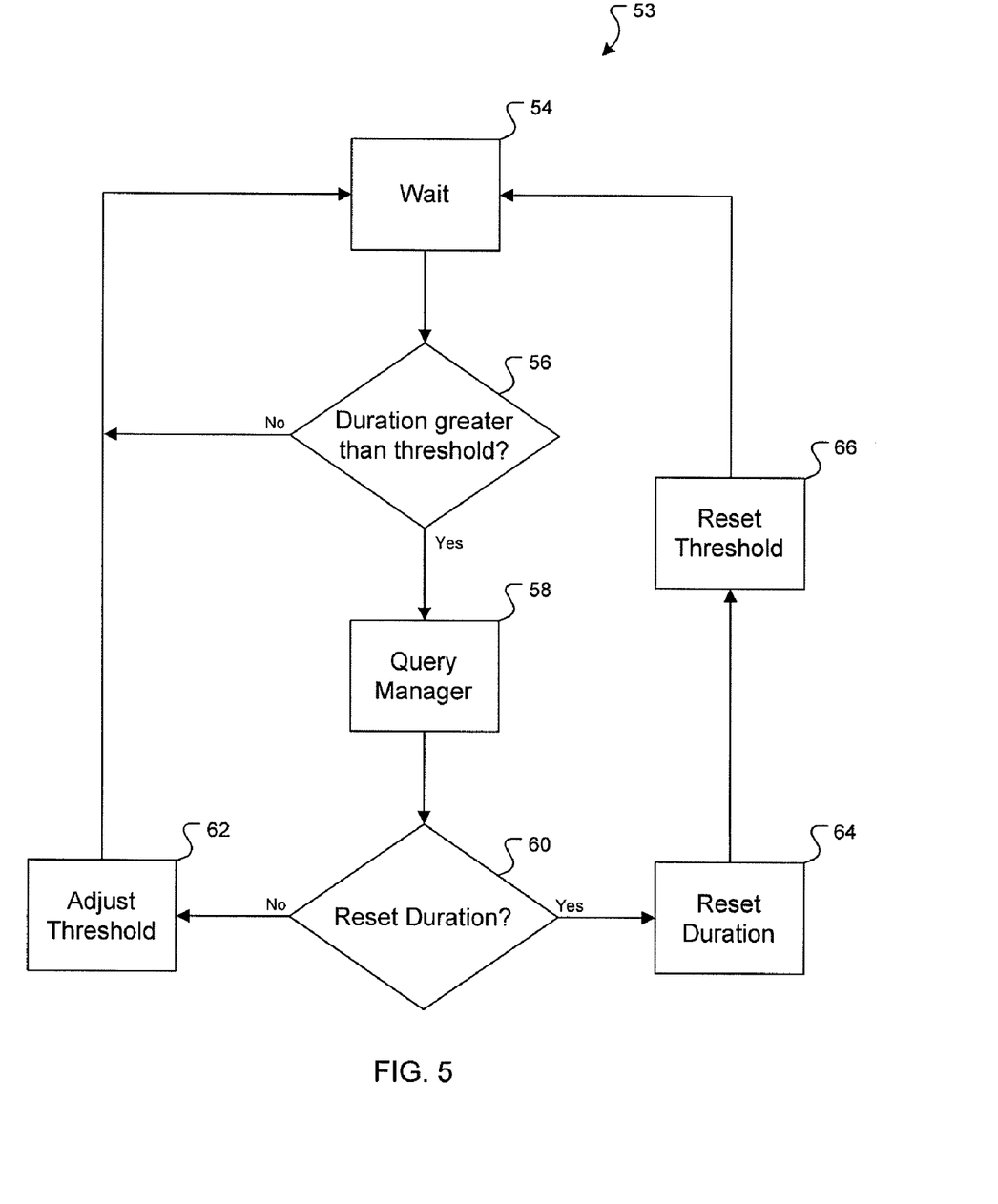

Referring to FIG. 5, it may happen that a portfolio 10 contains a stock 12 that the fund manager 24 makes repeated, conscious decisions to hold. Such a stock may remain in the portfolio for an extended period as the result of objective, numerically-derived analysis, and not due to any complacency or other psychological or sociological characteristics of the fund manager. The legacy risk metric described above may give misleading information. FIG. 5 is a flowchart for process 53 of updating and/or recalculating legacy risk contribution of a particular stock to account for such situations, by periodically querying a fund manager as to the status of the stock. In some implementations, the steps described in FIG. 5 below can be performed by risk management system 14, or more specifically the query tool 32.

For a given stock 12, a loop 54-56 is performed, until a threshold amount of time has passed. In some implementations, the threshold is monthly, but any threshold can be used, e.g. daily, weekly, quarterly etc. After the threshold time has elapsed, the fund manager 24 is queried about the portfolio's position with respect to the stock (step 58). In particular, the query is directed as to whether to reset the holding period of the stock. For example, one such type of query is directed to whether the fund manager would purchase the amount of this stock that is currently in the portfolio 10 if, instead of that amount of stock, the fund manager had corresponding value of cash with which to buy other stocks. Such an exemplary query may read: "You have held [number of shares] of [stock name] for [threshold] days. If these shares were liquidated right now, would you buy this many shares at [stock name]'s current price?"

In decision 60, the fund manager's response is examined. If the fund manager's response corresponds to taking no action with respect to the holding period of the stock, then the threshold is adjusted (step 62) so that the fund manager is queried again at a later date. In some implementations, the threshold is adjusted by adding a multiple of the original threshold to the previous threshold. In some implementations, the threshold is adjusted by adding one month to the previous threshold. Then the process 53 returns to the loop 54-56.

If, instead, the fund manager's response corresponds to resetting the holding period, then the holding period is reset (step 64). In some implementations, the holding period is reset by the stock data tool 28 and recorded in the stock data 18. In some implementations, the holding period of the stock is reduced to a pre-defined value, or reduced by a pre-defined factor. In some implementations, the pre-defined value is zero—i.e., as if the fund manager had just purchased the stock. The threshold is also reset to its initial value (step 66). The process 53 then returns to loop 54-56.

Figure 6:
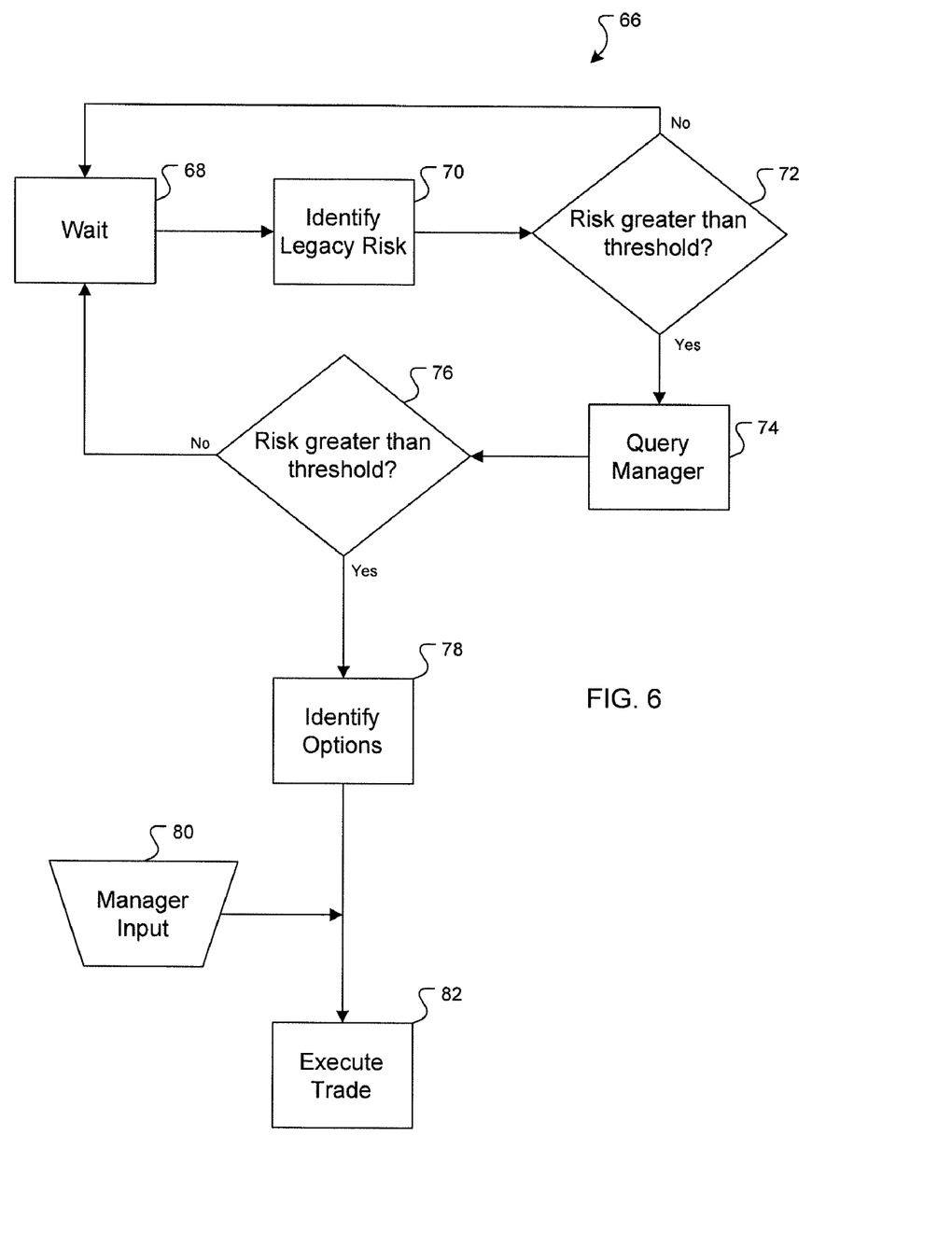
FIG. 6 is a flowchart for portfolio management using legacy risk.

FIG. 6 is a flowchart for a process 66 of managing a portfolio 10 using legacy risk. For a particular portfolio 10, process 66 begins with a loop 68-72, in which a legacy risk of the portfolio 10 is periodically identified and/or re-identified (step 70), until the legacy risk exceeds a pre-defined threshold. In some implementations, step 70 involves calculating legacy risk, e.g. using the risk tool 30. The pre-defined threshold is determined by the fund manager (or adopted by the fund manager after being determined by another party), depending on the manager's investment goals or philosophy.

If the legacy risk of the portfolio 10 exceeds the pre-defined threshold, process 66 can optionally query the fund manager as to some or all of the stocks 12 in the portfolio (step 74). Such a query would be handled as described above (see FIG. 5), and may result in lowering the legacy risk of the portfolio to below the pre-defined threshold (decision 76). If the legacy risk is lowered below the threshold, then process 66 returns to the loop 68-72.

Otherwise, process 66 identifies options for the manager to reduce the legacy risk of the portfolio. Options can be identified in any way. Exemplary options include the following: (1) if, during the optional step 74, the manager responded in a way that corresponds to a "no" in decision 60 (FIG. 5) with respect to one or more stocks, then selling a sufficient number of the one or more stocks to reduce the legacy risk below the threshold is an option; (2) selling a sufficient number of shares from among the top x legacy risk contributors to the portfolio, where x represents either a number or a quantile. In some embodiments, options are identified by the stock data tool 28 and/or the trading tool 34.

In some embodiments, the options identified in step 78 are presented to the fund manager 24 electronically, in an interactive format. Thus, the fund manager 24 may provide input 80, thereby specifying a trade from among the identified options (or another course of trading). Process 66 then executes the trade (step 82), thereby lowering the legacy risk below the threshold. In some embodiments, the trading tool 34 executes the trade.

Figure 7:
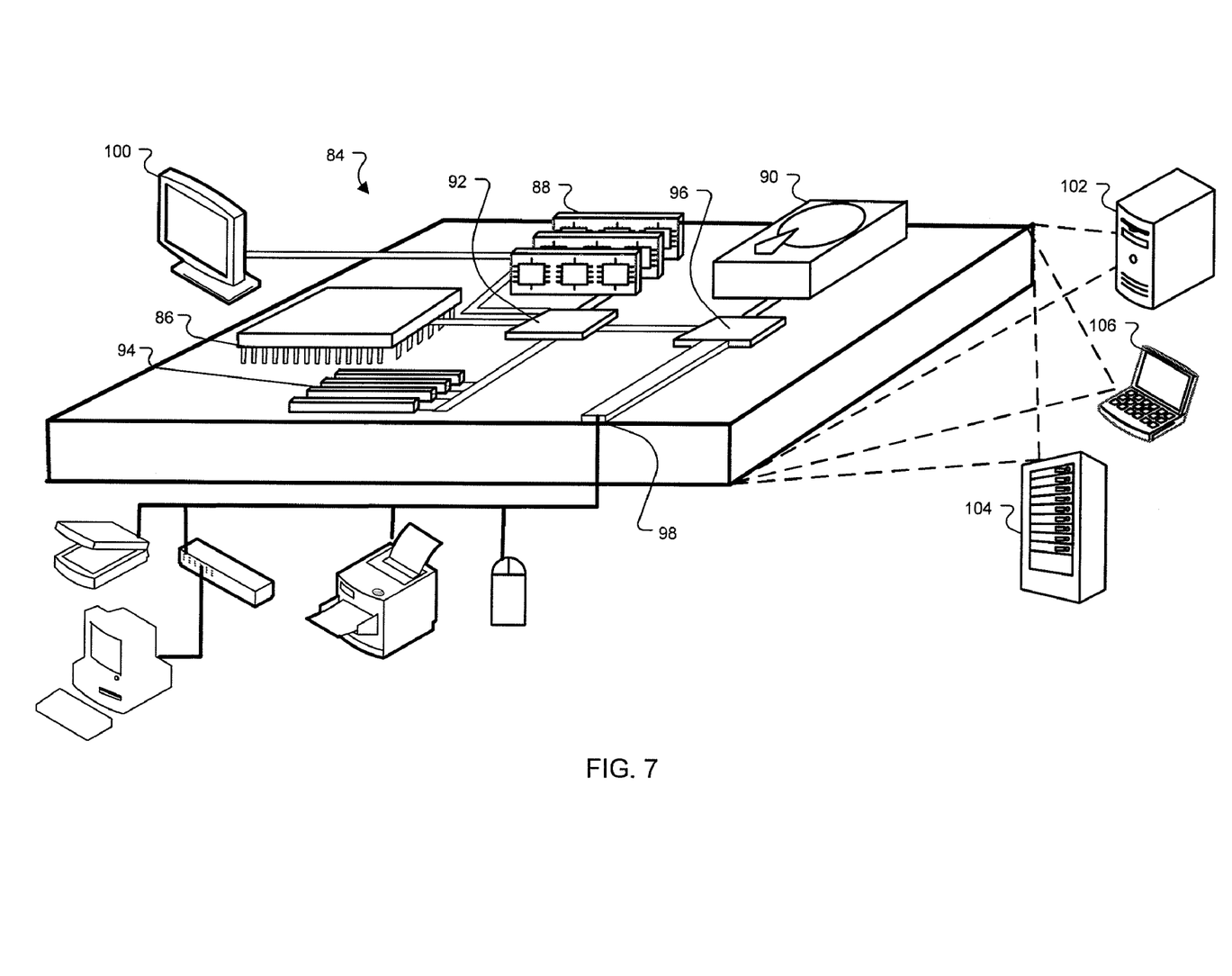
FIG. 7 is a schematic depiction of a computing device.

FIG. 7 is a block diagram of a computing device 84 that may be used to implement the risk management system 14, as either a client or as a server or plurality of servers. Computing device 84 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 84 includes a processor 86, memory 88, a storage device 90, a high-speed interface 92 connecting to memory 88 and high-speed expansion ports 94, and a low speed interface 96 connecting to low speed bus 98 and storage device 90. Each of the components 86, 88, 90, 92, 94, and 96, are interconnected using various busses, and may be mounted on a common motherboard or in other manners as appropriate. The processor 86 can process instructions for execution within the computing device 84, including but not limited to instructions stored in the memory 88 or on the storage device 90 to display graphical information for a GUI on an external input/output device, such as display 100 coupled to high-speed interface 92. In other implementations, multiple processors and/or multiple buses may be used, as appropriate, along with multiple memories and types of memory. Also, multiple computing devices 84 may be connected, with each device providing portions of the necessary operations (e.g., as a server bank, a group of blade servers, or a multi-processor system).

The memory 88 stores information within the computing device 84. In one implementation, the memory 88 is a computer-readable medium. In one implementation, the memory 88 is a volatile memory unit or units. In another implementation, the memory 88 is a non-volatile memory unit or units.

The storage device 90 is capable of providing mass storage for the computing device 84. In one implementation, the storage device 90 is a computer-readable medium. In various different implementations, the storage device 90 may be a floppy disk device, a hard disk device, an optical disk device, or a tape device, a flash memory or other similar solid state memory device, or an array of devices, including but not limited to devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 88, the storage device 90, memory on processor 86, or a propagated signal.

The high-speed interface 92 manages bandwidth-intensive operations for the computing device 84, while the low speed interface 96 manages lower bandwidth-intensive operations. Such allocation of duties is exemplary only. In one implementation, the high-speed interface 92 is coupled to memory 88, display 100 (e.g., through a graphics processor or accelerator), and to high-speed expansion ports 94, which may accept various expansion cards (not shown). In the implementation, low speed interface 96 is coupled to storage device 90 and low speed bus 98. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 84 may be implemented in a number of different forms, as shown in the figure. For example, it may be implemented as a standard server 130, or multiple times in a group of such servers. It may also be implemented as part of a rack server system 104. In addition, it may be implemented in a personal computer such as a laptop computer 106.

Various implementations of the risk management system 14 (event search system 10, etc.) can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including but not limited to at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including but not limited to a machine-readable medium that receives machine instructions as a machine-readable signal. The term "machine-readable signal" refers to any signal used to provide machine instructions and/or data to a programmable processor.

To provide for interaction with a user, the risk management system 14 (event search system 10, etc.) can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including but not limited to acoustic, speech, or tactile input.

The risk management system 14 (event search system 10, etc.) can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the risk management system 14 (event search system 10, etc.)), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer-implemented method for assessing risk of securities, the method comprising:
    retrieving, from a machine-readable storage device, data corresponding to a portfolio of securities;
    identifying data corresponding to a legacy risk contribution of the portfolio of securities;
    computing, by a computing device, a legacy risk value of the set of securities based on the data corresponding to the legacy risk contribution;
    determining whether the legacy risk value exceeds a threshold value; and
    selling a portion of the portfolio of securities that causes a reduction in the legacy risk value of the portfolio of securities.

2. The method of claim 1, wherein selling the portion of the portfolio of securities further comprises iteratively:
- identifying a subset of securities in the portfolio of securities;
- computing, by the computing device, a legacy risk contribution of the subset;
- determining whether the legacy risk value minus the legacy risk contribution of the subset is less than the threshold value;
- selling the subset if the legacy risk value minus the legacy risk contribution of the subset is less than the threshold value; and
- including further securities in the subset if the legacy risk value minus the legacy risk contribution of the subset is greater than the threshold value.

3. A computer program product, tangibly embodied in a machine-readable storage device, the computer program product including instructions that cause one or more computing devices to:
- retrieve, from a machine-readable storage device, data corresponding to a portfolio of securities;
- identify data corresponding to a legacy risk contribution of the portfolio of securities;
- compute, by a computing device, a legacy risk value of the set of securities based on the data corresponding to the legacy risk contribution;
- determine whether the legacy risk value exceeds a threshold value;
- if the legacy risk value exceeds the threshold value, selling a portion of the portfolio of securities that causes a reduction in the legacy risk value of the portfolio of securities; and
- receive a confirmation of selling the portion of the portfolio of securities.

4. The computer program product of claim 3, wherein the instructions that sell the portion of the portfolio of securities comprises instructions that cause the one or more computing devices to iteratively:
- identifying a subset of securities in the portfolio of securities;
- computing, by the computing device, a legacy risk contribution of the subset;
- determining whether the legacy risk value minus the legacy risk contribution of the subset is less than the threshold value;
- selling the subset if the legacy risk value minus the legacy risk contribution of the subset is less than the threshold value; and
- including further securities in the subset if the legacy risk value minus the legacy risk contribution of the subset is greater than the threshold value.

5. A system for assessing risk of securities, the system comprising:
- a machine-readable storage device; and
- a data processor including:
  - means for retrieving, from a machine-readable storage device, data from the data store corresponding to a portfolio of securities;
  - means for identifying data from the machine-readable storage device corresponding to a legacy risk contribution of the portfolio of securities;
  - means for computing a legacy risk value of the set of securities based on the data corresponding to the legacy risk contribution;
  - means for determining whether the legacy risk value exceeds a threshold value;
  - means for selling a portion of the portfolio of securities if the legacy risk value exceeds the threshold value; and
  - means for receiving a confirmation of selling the portion of the portfolio of securities.

6. The system of claim 5, wherein the means for selling comprises means for iteratively:
- identifying a data from the data store corresponding to a subset of securities in the portfolio of securities;
- computing a legacy risk contribution of the subset;
- determining whether the legacy risk value minus the legacy risk contribution of the subset is less than the threshold value;
- selling the subset if the legacy risk value minus the legacy risk contribution of the subset is less than the threshold value; and
- including further securities in the subset if the legacy risk value minus the legacy risk contribution of the subset is greater than the threshold value.

7. The method of claim 1, wherein the portfolio of securities comprises a pre-selected portion of a fund's holdings.

8. The method of claim 7, wherein the pre-selected portion includes a pre-selected number of the fund's highest-weighted securities.

9. The method of claim 7, wherein the pre-selected portion includes a pre-selected number of the fund's longest-held securities.

10. The method of claim 7, wherein the pre-selected portion includes the entire fund.

11. The method of claim 1, wherein the data corresponding to the legacy risk contribution of the portfolio of securities is identified based on:
- a period with which a particular security in the portfolio of securities has been held; and
- a weight associated with the particular security.

12. The method of claim 1, wherein computing the legacy risk value comprises:
- identifying data corresponding to a particular security in the portfolio of securities;
- identifying data corresponding to a period with which the particular security has been held;
- identifying data corresponding to a weight associated with the particular security;
- identifying a period-scaling function;
- identifying a weight-scaling function;
- applying the period-scaling function to the period to produce a scaled period;
- applying the weight-scaling function to the weight to produce a scaled weight; and
- combining the scaled period and scaled weight.

13. The computer program product of claim 3, wherein the portfolio of securities comprises pre-selected portion of a fund's holdings.

14. The computer program product of claim 13, wherein the pre-selected portion includes a pre-selected number of the fund's highest-weighted securities.

15. The computer program product of claim 13, wherein the pre-selected portion includes a pre-selected number of the fund's longest-held securities.

16. The computer program product of claim 13, wherein the pre-selected portion includes the entire fund.

17. The computer program product of claim 3, wherein the data corresponding to the legacy risk contribution of the portfolio of securities is identified based on:
- a period with which the particular security in the portfolio of securities has been held; and
- a weight associated with the particular security.

18. The computer program product of claim 3, wherein the instructions that identify a legacy risk contribution includes instructions that cause the one or more computing devices to:
  identify data corresponding to a particular security in the portfolio of securities;
  identify data corresponding to a period with which the particular security has been held;
  identify data corresponding to a weight associated with the particular security;
  identify data corresponding to a period-scaling function;
  identify data corresponding to a weight-scaling function;
  apply the period-scaling function to the period to produce a scaled period;
  apply the weight-scaling function to the weight to produce a scaled weight; and
  combine the scaled period and scaled weight.

* * * * *

UNITED STATES PATENT AND TRADEMARK OFFICE
CERTIFICATE OF CORRECTION

Page 1 of 3

| | |
|---|---|
| PATENT NO. | : 8,019,671 B2 |
| APPLICATION NO. | : 12/361371 |
| DATED | : September 13, 2011 |
| INVENTOR(S) | : Goolgasian |

It is certified that error appears in the above-identified patent and that said Letters Patent is hereby corrected as shown below:

In the Claims

Column 10, Line 54-65, Claim 1 should read

1. A computer-implemented method for assessing risk of securities, the method comprising:
retrieving, from a machine-readable storage device, data corresponding to a portfolio of securities;
identifying data corresponding to a legacy risk contribution of the portfolio of securities;
computing, by a computing device, a legacy risk value of the set of securities based on the data corresponding to the legacy risk contribution;
determining whether the legacy risk value exceeds a threshold value; and
if the legacy risk value exceeds the threshold value, selling a portion of the portfolio of securities that causes a reduction in the legacy risk value of the portfolio of securities, wherein selling the portion of the portfolio of securities further comprises iteratively:
identifying a subset of securities in the portfolio of securities;
computing, by the computing device, a legacy risk contribution of the subset;
determining whether the legacy risk value minus the legacy risk contribution of the subset is less than the threshold value; and
selling the subset if the legacy risk value minus the legacy risk contribution of the subset is less than the threshold value.

Column 11, Line 1-3, Claim 2 should read

2. The method of claim 1, wherein selling the portion of the portfolio of securities further comprises: including further securities in the subset if the legacy risk value minus the legacy risk contribution of the subset is greater than the threshold value.

Signed and Sealed this
Eleventh Day of February, 2014

Michelle K. Lee
*Deputy Director of the United States Patent and Trademark Office*

CERTIFICATE OF CORRECTION (continued)
U.S. Pat. No. 8,019,671 B2

Column 11, Line 17-35, Claim 3 should read

3. A computer program product, tangibly embodied in a machine-readable storage device, the computer program product including instructions that cause one or more computing devices to:
retrieve, from a machine-readable storage device, data corresponding to a portfolio of securities;
identify data corresponding to a legacy risk contribution of the portfolio of securities;
compute, by a computing device, a legacy risk value of the set of securities based on the data corresponding to the legacy risk contribution;
determine whether the legacy risk value exceeds a threshold value;
if the legacy risk value exceeds the threshold value, sell a portion of the portfolio of securities that causes a reduction in the legacy risk value of the portfolio of securities, wherein the instructions that cause the one or more computing devices to sell the portion of the portfolio of securities also cause the one or more computing devices to iteratively:
identify a subset of securities in the portfolio of securities,
compute, by the computing device, a legacy risk contribution of the subset,
determine whether the legacy risk value minus the legacy risk contribution of the subset is less than the threshold value, and
sell the subset if the legacy risk value minus the legacy risk contribution of the subset is less than the threshold value; and
receive a confirmation of selling the portion of the portfolio of securities.

Column 11, Line 36-39, Claim 4 should read

4. The computer program product of claim 3, wherein the instructions that sell the portion of the portfolio of securities further comprises instructions that cause the one or more computing devices to:
include further securities in the subset if the legacy risk value minus the legacy risk contribution of the subset is greater than the threshold value.

Column 11, Line 53-67 and Column 12, Line 1-6, Claim 5 should read

5. A system for assessing risk of securities, the system comprising:
a machine-readable storage device; and
a data processor including:
means for retrieving, from a machine-readable storage device, data from the data store corresponding to a portfolio of securities;
means for identifying data from the machine-readable storage device corresponding to a legacy risk contribution of the portfolio of securities;
means for computing a legacy risk value of the set of securities based on the data corresponding to the legacy risk contribution;
means for determining whether the legacy risk value exceeds a threshold value;
means for selling a portion of the portfolio of securities if the legacy risk value exceeds the threshold value,
wherein the means for selling comprises means for iteratively:
identifying a subset of securities in the portfolio of securities,
computing, by the computing device, a legacy risk contribution of the subset,

CERTIFICATE OF CORRECTION (continued)
U.S. Pat. No. 8,019,671 B2 determining whether the legacy risk value minus the legacy risk contribution of the subset is less than the threshold value, and selling the subset if the legacy risk value minus the legacy risk contribution of the subset is less than the threshold value; and means for receiving a confirmation of selling the portion of the portfolio of securities.

Column 12, Line 6-8, Claim 6 should read

6. The system of claim 5, wherein the means for selling comprises:
means for including further securities in the subset if the legacy risk value minus the legacy risk contribution of the subset is greater than the threshold value.